No. 642,133. Patented Jan. 30, 1900.
H. J. KIMMAN.
DIRECT ACTING ENGINE.
(Application filed Mar. 30, 1899.)
(No Model.) 2 Sheets—Sheet 1.
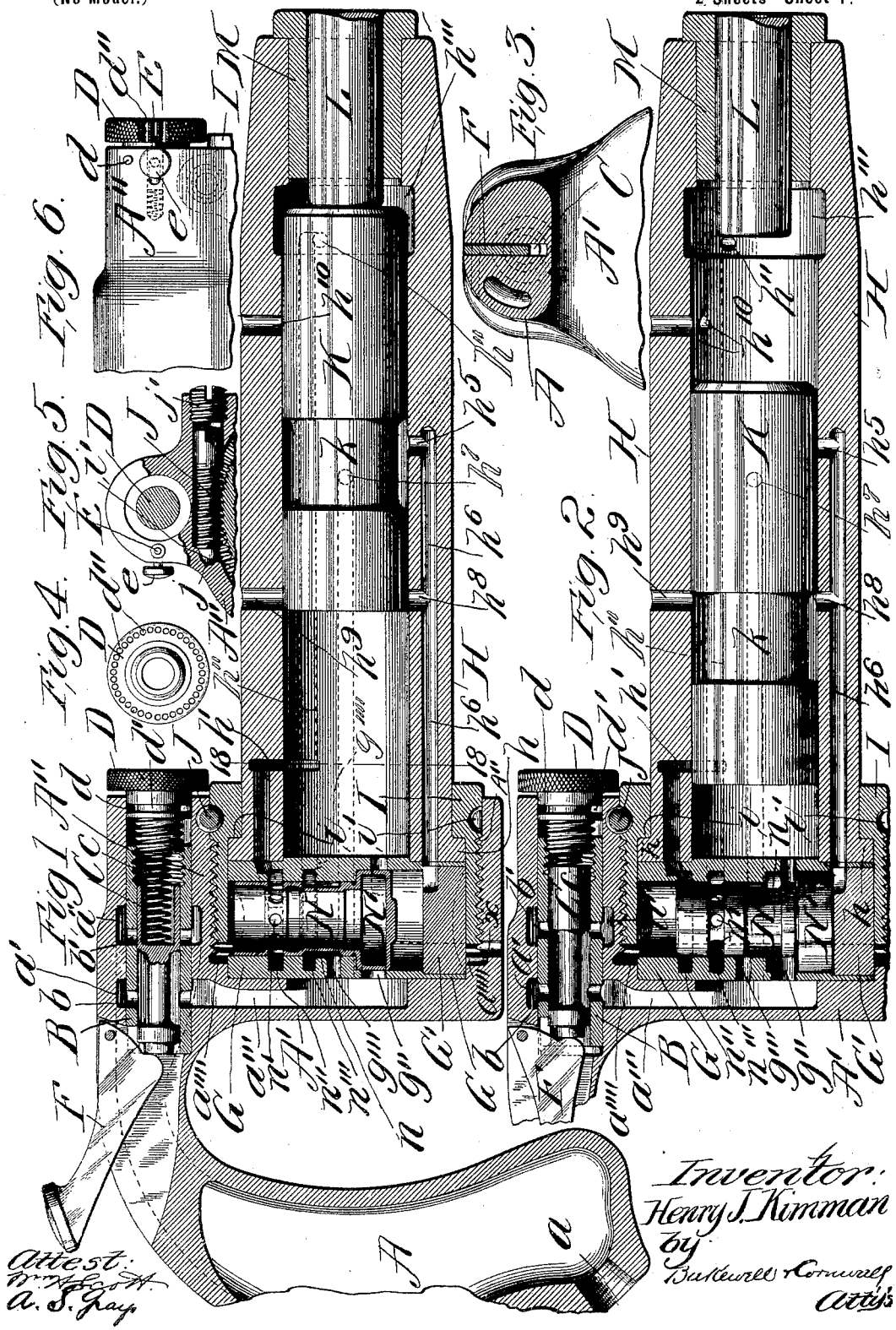
Inventor:
Henry J. Kimman
by
Bakewell & Cornwell
Att'ys
Attest:

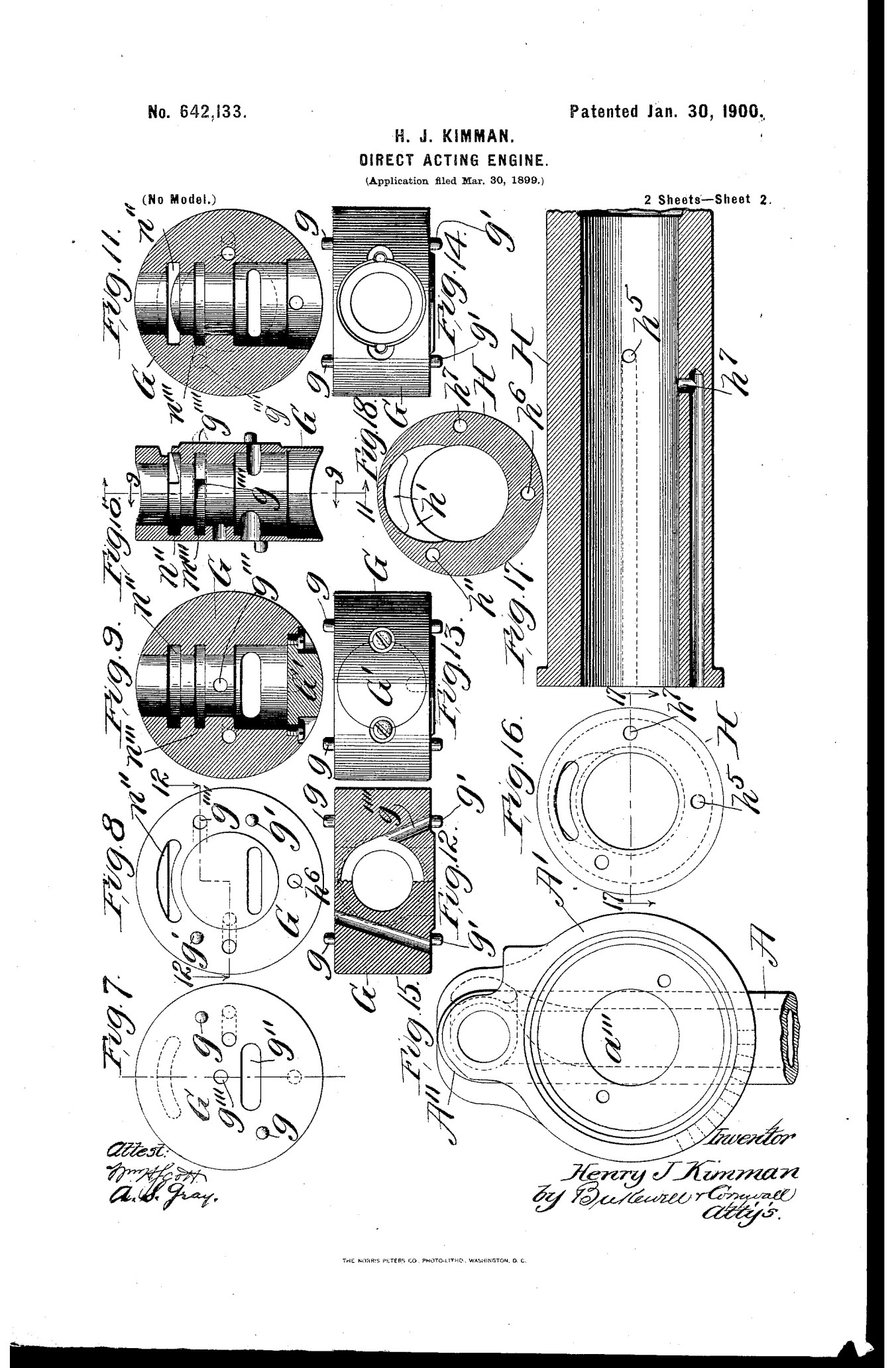

No. 642,133. Patented Jan. 30, 1900.
H. J. KIMMAN.
DIRECT ACTING ENGINE.
(Application filed Mar. 30, 1899.)

(No Model.) 2 Sheets—Sheet 2.

UNITED STATES PATENT OFFICE.

HENRY JAMES KIMMAN, OF CHICAGO, ILLINOIS, ASSIGNOR OF ONE-HALF TO EDWARD NASH HURLEY, OF SAME PLACE.

DIRECT-ACTING ENGINE.

SPECIFICATION forming part of Letters Patent No. 642,133, dated January 30, 1900.

Application filed March 30, 1899. Serial No. 711,121. (No model.)

*To all whom it may concern:*

Be it known that I, HENRY JAMES KIMMAN, a citizen of the United States, residing at the city of Chicago, State of Illinois, have invented a certain new and useful Improvement in Direct-Acting Engines, of which the following is a full, clear, and exact description, such as will enable others skilled in the art to which it appertains to make and use the same, reference being had to the accompanying drawings, forming part of this specification, in which—

Figure 1 is a longitudinal sectional view through my improved direct-acting engine. Fig. 2 is a similar view, part of the handle being broken away, showing the moving parts in a different position. Fig. 3 is a sectional view on line 3 3, Fig. 1. Fig. 4 is a detail view of the thumb-nut for adjusting the throttle-valve. Fig. 5 is a detail view, partly in cross-section, illustrating the lock for securing the coupling-sleeve in place. Fig. 6 is a detail side elevational view showing the manner of holding the thumb-nut which adjusts the throttle-valve in a locked or adjusted position. Fig. 7 is an end elevational view of the valve-block looking at the rear face thereof. Fig. 8 is a similar view looking at the inner or front face of said block. Fig. 9 is a cross-sectional view through said block looking in the direction of the arrows 9 9, Fig. 10. Fig. 10 is a vertical sectional view. Fig. 11 is a cross-sectional view as indicated by the arrows 11 11, Fig. 10. Fig. 12 is a longitudinal sectional view as indicated by the arrows 12 12, Fig. 8. Fig. 13 is a side elevational view illustrating the manner of closing the larger bore of the valve-chamber in the valve-block. Fig. 14 is a similar view with the block removed. Fig. 15 is an end elevational view as seen from the front, illustrating the handle-base. Fig. 16 is a rear end elevational view of the cylinder or barrel. Fig. 17 is a longitudinal sectional view of said cylinder or barrel on the line indicated by the arrows 17 17, Fig. 16; and Fig. 18 is a cross-sectional view through said cylinder on line 18 18, Fig. 1.

This invention relates to a new and useful improvement in direct-acting engines, commonly known as "pneumatic hammers."

The engines of the class to which the construction illustrated in the drawings relates are designed to be operated by compressed air supplied thereto through a flexible tube or hose, the engine being held to and guided in its work by an operator. Means are provided within convenient reach of the operator for regulating the admission of compressed air to the engine, to the end that the same may be controlled so that its piston will deliver light or heavy blows at will or that air may be shut off when desired. The type of engine shown in the accompanying drawings is that wherein a controlling-valve is employed for admitting and exhausting air to and from the chambers at each end of the piston, causing said piston to reciprocate. A tool in the form of a chisel, calking implement, or the like has its shank introduced in the front end of the cylinder or nose of the tool and receives impacting blows from the forward end of the piston.

The object of this present invention is to simplify the construction of engines of the character above described and at the same time render them efficient and economical in the use of air, according to the amount of work being done by the engine.

The features of invention in the tool illustrated in the drawings which are deemed new are, briefly, first, the construction and arrangement of an adjustable throttle-valve for controlling the admission of air to the engine; second, the means employed for locking the rotary parts of the engine against displacement by unscrewing; third, the novel construction, arrangement, and operation of the controlling-valve, and, fourth, the novel port arrangements in the cylinder coöperating with a piston operating in a uniform bore throughout the length of said cylinder; and, finally, the invention consists in the construction, arrangement, and combination of the several parts, all as will hereinafter be described and afterward pointed out the claims.

Referring to the drawings, A indicates a handle, the grasping portion of which is preferably made hollow, the end thereof communicating with a threaded opening *a*, in which is received a nipple in a flexible pressure-supply pipe, (not shown,) which pipe is connected to some suitable source of compressed-air supply or other pressure fluid.

A' indicates the handle-base, provided with an internal screw-flange A''. This flange is enlarged on one side, preferably in line with the handle A, and suitably bored to receive a sleeve B. This sleeve is provided with openings $b$ and $b'$, the latter of which is controlled by valve C. Elongated chambers $a'$ and $a''$ are formed in the handle-base to register with these openings $b$ and $b'$, the chamber $a''$ being in communication with the air-supply duct formed in the handle A and the chamber $a'$ being in communication with the passage-way $a'''$ formed in the handle-base, through which passage-way the air passes to the engine. The forward end of sleeve B has a threaded connection with a rotary plug D, so that by turning said plug the sleeve can be adjusted longitudinally for the purpose of changing the position of its opening $b'$ with relation to the forward head of valve C. Plug D is held against axial movement by a cross-pin $d$, fitting in a circumferential groove $d'$, formed in the hub of said plug, and in order to lock the plug in its adjusted position I prefer to form a series of notches or openings $d''$ in its external flange, with which notches or openings coöperates a spring-pressed pin E, provided with a suitable button $e$, by which said pin may be retracted out of engagement with the plug, thereby permitting the plug to be rotated, and when said pin is in its normal forward position it engages one of the notches or openings and locks said plug in place.

Interposed between plug D and valve C is a spring $c$, tending at all times to force said valve rearwardly or in its home position.

The rear end of valve C is formed with a head, with which coöperates a handle F, pivoted so as to swing in a slot in the main handle A, said lever or trigger F having a suitable button or thumb-piece at its outer end by which the same may be operated.

The operation of the throttle-valve just described is as follows: Assuming the parts to be in position, as shown in Fig. 1, it will be obvious that when trigger or lever F is depressed the valve C will be moved forwardly to open the port $b'$ in the sleeve B and permit pressure in chamber $a''$ to pass through the sleeve B around the waist of the valve and out through the ports $a'$ and into passage $a'''$, whence it is admitted to the engine. When trigger F is moved to the full limit of its stroke, the full port area of the throttle-valve is open, while the parts are in the position shown in Fig. 1. Assuming that plug D is rotated so as to move the sleeve B forwardly in a direction longitudinally of its axis, as shown in Fig. 2, it will be obvious that when trigger F is operated while the valve C moves the same distance the initial movement thereof accomplishes nothing by reason of the forward displacement of the port $b'$. Just before the valve completes its final movement its forward head opens the port $b'$, as shown. The available area of port $b'$ through which pressure may pass when the valve is in its forward position can be adjusted by rotating the plug D, and by such adjustment nothing is left to be determined by the operator in his manipulation of the trigger F, as said trigger is pushed to the full limit of its movement whenever it is desired to admit pressure to the engine. This is advantageous because it admits of the adjustment of the throttle-valve before work is begun, so that a certain amount of pressure can be admitted to the engine, and all that is required to admit that amount of pressure to the engine is the full movement of the lever or trigger F. This relieves the operator from the strain of trying to maintain the lever in a certain position when the engine is being worked in order to admit the small amount of pressure thereto. The spring-pressed pin forms an important function in this connection in absolutely holding the sleeve B in its adjusted longitudinal position. When it is desired to change the area for the admission of pressure to the engine, either by increasing or decreasing the same, the plug D is rotated in one direction or the other to force the sleeve B rearwardly to increase the area and forwardly to decrease said area. Plug D in its threaded connection with the sleeve B may be provided with a double thread or a thread with suitable pitch so as to accomplish the longitudinal movement of said sleeve without necessitating a number of turns of said plug.

G indicates a valve-block which is received in the forward end of the handle-base A', being held against rotary movement therein by suitable dowel-pins $g$, which are received in recesses or openings in said handle-base. This valve-block is illustrated in Figs. 7 to 14, wherein it will be seen to consist of a block, preferably circular in cross-section, formed with a transverse bore and provided with suitable port-openings to coöperate with a valve carried in its bore to admit and exhaust pressure at each end of said bore to throw the valve and admit and exhaust pressure to and from suitable registering passages leading to each end of the cylinder or barrel.

H indicates the cylinder, which abuts against the front face of the valve-block, the rear end of said cylinder being provided with an external flange $h$, coöperating with an internal flange $i$ on a collar or coupling-sleeve I, said sleeve being externally threaded to engage the flange A'' of the handle-base, so as to clamp the parts together. The valve-block is provided with dowels $g'$, and its front faces are received in suitable openings in the rear end of the cylinder to prevent independent rotation of said parts when assembled. In order to lock the coupling-sleeve in position so as to prevent the same jarring loose, which would permit the pressure fluid to blow through, I provide a threaded annular groove $i'$ at the forward end of said coupling-sleeve, with which coöperates a bolt or threaded rod J, introduced through an opening in the side of the handle-base. This screw-bolt J, as shown in Fig. 5, has its forward end $j$ seated in a suitable pocket axially in line with the lateral bore, which receives said screw, the outer end thereof being slotted for the reception of a suitable tool in the form of a screwdriver, by which the same may be rotated and screwed in position. It will be noted that screw J has no threaded engagement with the handle-base, but is free to rotate therein, and, being received by and engaging with the threads in the annulus $i'$, will prevent said sleeve from unscrewing when said screw J is in position. Furthermore, after screw J is introduced to lock the parts together a continued rotation thereof will rotate the sleeve I slightly in the direction in which it moves to be screwed to its home position. This is advantageous in that while it is possible for screw J to rotate the sleeve it is practically impossible for the sleeve to rotate the screw, due to the slight pitch of the parts which engage each other. I prefer to introduce a plug $j'$ in the bore of screw J, so as to prevent the entrance of dirt, &c., and gives additional security, as pitch of plug-thread is finer than that of screw J and any rotation would have a tendency to lock the same.

The bore of cylinder H is practically of the same diameter throughout its length and receives a piston K of corresponding diameter, said piston having a reduced or waist portion $k$ near its rear end, forming practically two heads at the ends of said piston. This piston coöperates with a tool-shank (marked L in Figs. 1 and 2) which is loosely introduced into a wear-sleeve M, fitting into the end of a cylinder.

I will now describe the operation of the engine, referring to the various ports which are controlled by the piston and the valve in the valve-block.

The valve which is arranged in the valve-block consists of a hollow body portion N, which operates in the smaller bore of the valve-block, and an enlarged head portion N', which operates in the larger bore of said valve-block. This larger bore is closed by a plug G', while the opposite side or the smaller bore is left open by the sleeve I. The external periphery of the body portion of valve N is practically uniform throughout its length, with the exception of a reduced portion $n$ near the head, while ports $n'$ are arranged near the forward end of said valve to coöperate with suitable circular chambers communicating with the smaller bore in said valve-block. These chambers I have marked $n''$ and $n'''$. Assuming the parts to be in the position shown in Fig. 1, the head of the valve registers with and closes alining ports $g''$, one of which is in communication with the supply-port $a'''$. In this position no pressure is admitted to the chamber behind the piston. Ports $n'$, however, register with the chamber $n''$, into which chamber leads a port $h'$, opening from the cylinder-bore near the rear end thereof. Port $h'$ exhausts pressure from the rear end of the cylinder-bore in this position of the valve, leading said exhaust to the chamber $n''$, whence it passes through the ports $n'$ into the valve and out through the end of the smaller bore in the valve-block into an annular chamber $a''''$, whence the exhaust passes into the atmosphere through exhaust-openings $x$ in the handle-base. Incident to this position of the valve, pressure is admitted in front of the piston through the ports $g'''$, the reduced portion in the body of the valve, chamber $n'''$, port $g''''$, and port $h''$, which opens into an enlarged chamber $h'''$ in the cylinder and in front of the piston. Pressure being now exhausted from behind the piston and admitted in front thereof, said piston will start on its rearward movement and in such rearward movement will accomplish the following:

First. Close a port $h^5$, which has hitherto admitted pressure behind the larger head of the valve through a port $h^6$, the reduced portion $k$ of the piston registering an inlet-port $h^7$ with the port $h^5$.

Second. The forward head of the piston will next close the inlet-ports $h^5$ and $h^7$ in the order named.

Third. The rear head of the piston passes an inlet-port $h^8$, leading from the port $h^6$, and the reduced portion $k$, by establishing communication between the ports $h^8$ and an exhaust-port $h^9$, relieves the pressure from behind the larger head of the valve. During this operation of exhausting the pressure from the larger head of the valve the port $h^5$ is closed by the front head of the piston.

Fourth. A port $h^{10}$ exhausts the pressure from the forward end of the piston, beyond which point the piston travels by momentum until the port $h'$ is reached, which port, being located some distance in advance of the valve-block, will confine a sufficient quantity of air to offer a cushion to the rearwardly-moving piston, rendering the striking of said valve-block by the rear head of the piston practically impossible in the normal operation of the engine.

Fifth. Just before the port $h^{10}$ was opened to exhaust the pressure in front thereof, the pressure behind the larger head of the valve having previously been exhausted, the pressure entering port $g'''$ will operate on the inner face of the larger head of the valve to throw said valve to its other position, which is shown in Fig. 2. By the time the valve has been thrown to this position the piston will have reached its rearmost position, in which the pressure from the supply-duct $a'''$ will now pass directly into the rear chamber of the cylinder, forcing said piston forward, so that the forward movement of the piston under such pressure will accomplish the following:

Sixth. Open the port $h'$, which practically accomplishes nothing, since the annular chamber $n''$ is closed by the end of the body portion of the valve.

Seventh. The exhaust-port $h^{10}$ will be closed by the forward end of the piston, and the pressure in front of said piston will now be exhausted through port $h''$, entering the annular chamber $n'''$, whence it passes through the ports $n'$ of the valve, through the hollow valve to the exhaust-chamber $a''''$, and out through the exhaust-outlets $x$.

Eighth. The rear head of the piston will close the ports $h^8$ and $h^9$.

Ninth. Space $k$ will register with port $h^i$.

Tenth. Port $h^5$ will be open to admit pressure behind the larger head of the valve, so as to throw the same to its other position or to the position shown in Fig. 1.

Eleventh. The piston then delivers a quick impacting blow on the end of the chisel-shank L, introduced into the forward end of the cylinder, the rebound of the piston being in the direction it will now travel by pressure being admitted through the port $h''$. On the return or rearward movement of the piston the cycle of operations above described will follow.

It will be observed that in the construction above described a closed head at the forward end of the cylinder is necessary to the successful operation of the engine. The absence of the chisel-shank L will therefore cause the piston to cease reciprocating, pressure blowing through the space formerly occupied by said chisel-shank. This is an advantageous feature, for the reason that while a small amount of pressure is lost when the engine is not operating it saves the operator considerable annoyance in not having to handle a tool which is constantly vibrating when he moves from one part of the shop to the other. It frequently occurs in practical operation that a workman will tie the handle coöperating with the throttle-valve in a fixed position, so as to be relieved of the strain of holding the throttle-valve open when working, and when the engine is not applied to actual work the vibration of the same is not only inconvenient and unpleasant, but frequently the piston will hammer itself at either end of the cylinder and so battering the metal that its easy operation is affected. By the use of my construction when the workman takes the engine away from its work he simply removes the chisel, when the piston will move forward to an abnormal position, so as to permit the pressure from port $h''$ to blow through, and in such position pressure from port $h^8$ will likewise blow through $k$, $h^5$, $h^6$, $h^8$, and $h^9$. When the chisel-shank opening is closed, either by the introduction of the chisel-shank or any other way, when pressure is being admitted to the engine, pressure through port $h''$ will immediately force the piston rearwardly, closing ports $h^8$ and $h^9$, and reciprocation of the piston will thereupon commence.

I am aware that many minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. In a pneumatic hammer having an inlet-passage for the admission of the motive fluid, the combination with the throttle-valve controlling said passage, of a sleeve, in which said valve is mounted, and means for adjusting said sleeve so as to change the relation of the port-openings therein relative to said throttle-valve; substantially as described.

2. In a pneumatic hammer having an inlet-passage for the admission of the motive fluid, the combination with the throttle-valve controlling said passage, of a spring for pressing said valve in a direction to close said passage, a sleeve in which said valve is mounted, and means for adjusting said sleeve so as to change the position of ports therein relative to said valve; substantially as described.

3. In a pneumatic hammer having an inlet-passage for the admission of motive fluid, the combination with the throttle-valve controlling said passage, of a spring pressing said valve in its closed position, a sleeve in which said valve is mounted, a plug having a threaded engagement with said sleeve, whereby, upon the rotation of said plug, the sleeve is adjusted longitudinally on its axis, and means for locking said plug in a rotatable adjustable position; substantially as described.

4. In a pneumatic hammer having an inlet-passage for the admission of the motive fluid, the combination with the throttle-valve controlling said passage, of means for pressing said valve in one direction to close said passage, a lever for moving said valve in the opposite direction for opening said passage, and an adjustable sleeve inclosing said valve; substantially as described.

5. In a pneumatic hammer having an inlet-passage for the admission of the motive fluid, the combination with the throttle-valve controlling said passage, of a spring for pressing said valve in a direction to close said passage, a sleeve inclosing said valve, said sleeve containing ports, a plug having a threaded connection with said sleeve for adjusting the same longitudinally, and means for holding said plug in its different rotatory positions; substantially as described.

6. In a pneumatic hammer having an inlet-passage for the admission of the motive fluid, the combination with a reciprocating throttle-valve for controlling said passage, of means for pressing said valve in one direction to close said passage, a lever for moving said valve in an opposite direction to open said passage, a sleeve inclosing said valve, an adjustable screw-plug engaging said sleeve to move the same longitudinally, and means for locking said screw-plug in its different adjusted positions; substantially as described.

7. In a pneumatic hammer, the combination of the handle having the inlet-passage extending through it, the throttle-valve arranged to reciprocate in a bore of said handle for controlling said inlet-passage, an adjustable sleeve inclosing said valve, and provided with ports which are constantly in register with the inlet-passage through the handle, and other ports which are constantly in register with a supply-passage to the engine, means in engagement with said sleeve for adjusting the same longitudinally, and a lever for operating said valve independently of said sleeve; substantially as described.

8. In a pneumatic hammer, the combination with the handle provided with an inlet-passage for the motive fluid, of a sleeve introduced in said passage, and provided with suitable port-openings for the admission of pressure from said passage into said sleeve, means for adjusting said sleeve, a throttle-valve arranged in said sleeve, and means for operating said valve independently of said sleeve; substantially as described.

9. The combination with a cylinder provided with a flange on its rear end, of a coupling-sleeve coöperating with said flange and provided with a threaded groove, a handle-base formed with a tangential opening, a bolt which passes through said opening and engages the threaded groove of the coupling-sleeve for locking the same against movement, and means for locking the handle-base against rotary movement relative to the cylinder; substantially as described.

10. The combination with a handle-base formed with a smooth tangential bore, of a collar or coupling-sleeve having a threaded connection with said base, the periphery of said coupling-sleeve being provided with a threaded groove, and a screw-bolt which is introduced into the bore in the handle-base, where it is free to be thrown to engage the threaded groove of the coupling-sleeve; substantially as described.

11. In a pneumatic hammer, the combination with a handle-base, of a coupling-sleeve having a threaded connection therewith, a screw-bolt which is received by a plain-bored opening in said handle-base and which engages with a threaded groove in the coupling-sleeve in such manner that when said screw-bolt is rotated it will have a tendency to force said coupling-sleeve to its home position; substantially as described.

12. In a pneumatic hammer, the combination with a handle-base formed with a tangential bore, of a collar or coupling-sleeve, which is secured in said handle-base, the periphery of said coupling-sleeve being provided with a threaded groove, and a screw-bolt, which is introduced into the bore in the handle-base for engaging the threaded groove of the coupling-sleeve, and locking the parts against independent rotation; substantially as described.

13. In a pneumatic hammer, the combination with the cylinder and its piston, of a cylindrical valve comprising a hollow body portion open at one end, and an enlarged head at the other end of said body portion, said head being closed, said valve admitting and exhausting pressure to and from the ends of said cylinder to throw said piston, and ports controlled by said piston for intermittently admitting and exhausting pressure to the enlarged closed end of said valve; substantially as described.

14. The combination with a cylinder having a bore of the same diameter throughout its length, of a piston arranged therein, which piston is formed with a reduced portion intermediate its ends, a differential valve for admitting and exhausting pressure to and from the ends of said cylinder, said valve comprising a hollow body portion open at one end and an enlarged head at the other end of said body portion, said head being closed, ports which are controlled by the reduced portion in said piston for admitting and exhausting pressure to and from the outer face of the enlarged closed head portion of said valve, a port for admitting constant pressure against the inner face of the shoulder of the head of said valve, and a port leading from the other or small end of the valve-chamber, which last-named port is constantly open to the exterior; substantially as described.

15. The combination with a cylinder having a bore of uniform diameter throughout its length, of a piston arranged in said cylinder, and formed with a reduced portion intermediate its ends, a hollow valve formed with an enlarged closed head at one end, said valve admitting and exhausting pressure to and from the ends of the cylinder to throw said piston, a constantly-open port leading from the end of the valve-chamber of small diameter, and from the hollow body portion of the valve and communicating with the exterior, suitable ports leading behind the larger or closed head portion of said valve, and which are controlled by the reduced portion of said piston for intermittently admitting and exhausting pressure to and from said larger or closed head portion of the valve, and a port for admitting constant pressure to the inner face of the shoulder of the head of said valve; substantially as described.

16. The combination with a cylinder and its piston, of a hollow valve comprising a body portion and an enlarged closed head portion, said body portion being externally reduced near said head, and suitable ports, whereby said valve admits pressure to one end of the cylinder while exhausting pressure from the opposite end of said cylinder, and vice versa, said valve being thrown in proper position to accomplish the admission and exhaust of pressure to and from the ends of the piston, by the piston; substantially as described.

17. The combination with a cylinder and its piston, said piston being formed with a reduced portion, of a hollow valve comprising a body portion and an enlarged closed head at one end, said body portion being reduced externally near said head, a valve-block containing a chamber bored to two different diameters, in which said valve reciprocates, ports in said valve near its end for exhausting pressure from the rear end of the cylinder, ports controlled by said reduced portion in the valve for admitting pressure to the front end of the cylinder, and a port controlled by the head of said valve for admitting pressure to the rear end of the cylinder; substantially as described.

18. The combination with a cylinder and its piston, of a differential valve for controlling the movements of said piston, the movement of said valve in one direction being controlled by said piston, suitable port arrangements coöperating with said valve and piston for accomplishing the above, one of which ports $h'$, is located some distance from the end of the cylinder to provide a cushion of dead air for the piston; substantially as described.

19. The combination with a cylinder and its piston, of a differential valve for admitting and exhausting pressure to and from each end of said cylinder, said valve comprising a hollow body portion and an enlarged head at one end of said body portion, said head being closed, a chisel-shank which is introduced into the cylinder to form part of one of its end walls, whereby, upon the removal of said chisel-shank, pressure will blow through the opening provided to receive the same; substantially as described.

20. The combination with a cylinder and its piston formed with a reduced portion, of a differential valve formed with a reduced portion and suitable ports or openings, said valve being hollow and formed with an enlarged closed head at one end, admission and exhaust passages in said cylinder which are controlled by said valve for admitting and exhausting pressure to and from the ends of said cylinder, a passage communicating with the space behind the enlarged or closed head portion of said valve and entering the cylinder at different points to coöperate with the reduced portion of said piston, and a chisel-shank loosely inserted in said cylinder; substantially as described.

21. The combination with a cylinder formed with exhaust-ports $h'$ and $h^9$, a port $h''$, which intermittently admits and exhausts pressure to the forward end thereof, a port $h^7$, which is constantly open to pressure, ports $h^5$ and $h^8$ connecting the bore of the cylinder with the passage $h^6$, for intermittently admitting and exhausting pressure to one end of a controlling-valve, a piston formed with a reduced portion for coöperating with the ports $h^5$, $h^6$, $h^7$, $h^8$, and $h^9$, and a differential valve for opening and closing the exhaust-port $h'$, intermittently admitting and exhausting pressure through the port $h''$, and intermittently admitting pressure through the port $g''$; substantially as described.

In testimony whereof I hereunto affix my signature, in the presence of two witnesses, this 20th day of March, 1899.

HENRY JAMES KIMMAN.

Witnesses:
 A. E. STURGES,
 GEO. W. FARR.